United States Patent
Stockwell

(10) Patent No.: US 10,227,931 B2
(45) Date of Patent: Mar. 12, 2019

(54) VARIABLE INLET GUIDE VANE SCHEDULING

(71) Applicant: ROLLS-ROYCE plc, London (GB)

(72) Inventor: Mark T Stockwell, Derby (GB)

(73) Assignee: ROLLS-ROYCE plc, London (GB)

( * ) Notice: Subject to any disclaimer, the term of this patent is extended or adjusted under 35 U.S.C. 154(b) by 431 days.

(21) Appl. No.: 15/075,919

(22) Filed: Mar. 21, 2016

(65) Prior Publication Data

US 2016/0281611 A1    Sep. 29, 2016

(30) Foreign Application Priority Data

Mar. 26, 2015  (GB) ................... 1505113.9

(51) Int. Cl.
*F02C 9/20*  (2006.01)
*B64C 11/30*  (2006.01)
(Continued)

(52) U.S. Cl.
CPC .............. *F02C 9/20* (2013.01); *B64C 11/305* (2013.01); *F02C 7/042* (2013.01); *F02C 7/262* (2013.01); *F02C 9/54* (2013.01); *F04D 27/0246* (2013.01); *F04D 29/321* (2013.01); *F04D 29/542* (2013.01); *F04D 29/563* (2013.01);
(Continued)

(58) Field of Classification Search
CPC ...... F02C 9/20; F02C 9/22; F02C 9/54; F02C 7/262; F04D 27/002; F04D 27/0023; F04D 27/0246; F04D 27/0253; F04D 29/321; F04D 29/542; F04D 29/563; F05D 2240/12; F05D 2260/85; F05D 2270/304; F05D 2270/092
See application file for complete search history.

(56) References Cited

U.S. PATENT DOCUMENTS

| 4,275,560 A * | 6/1981 | Wright .................... F02K 3/075 |
| | | 415/148 |
| 2013/0192195 A1* | 8/2013 | Wehmeier ............. F02K 1/1207 |
| | | 60/204 |

(Continued)

FOREIGN PATENT DOCUMENTS

| DE | 19901509 A1 | 7/2000 |
| WO | 2013/115994 A2 | 8/2013 |
| WO | 2013/154638 A1 | 10/2013 |

OTHER PUBLICATIONS

Aug. 15, 2016 Search Report issued in European Patent Application 16160589.

(Continued)

*Primary Examiner* — Carlos A Rivera
*Assistant Examiner* — Sang K Kim
(74) *Attorney, Agent, or Firm* — Oliff PLC

(57) ABSTRACT

There is disclosed an aero gas turbine engine comprising a compressor and an array of variable inlet guide vanes for the compressor. The angle of the variable inlet guide vanes is controlled by scheduling, the scheduling comprising a first component invoked for engine ground start and a second component invoked for engine in-flight windmill start at least under particular flight conditions. The angle of the variable inlet guide vanes required by at least a portion of the second component is greater than the angle of the variable inlet guide vanes required by at least a portion of the first component.

15 Claims, 2 Drawing Sheets

(51) Int. Cl.
  *F04D 27/02*    (2006.01)
  *F02C 7/262*    (2006.01)
  *F04D 29/54*    (2006.01)
  *F04D 29/56*    (2006.01)
  *F02C 9/54*     (2006.01)
  *F02C 7/042*    (2006.01)
  *F04D 29/32*    (2006.01)

(52) U.S. Cl.
  CPC .......... *F05D 2220/323* (2013.01); *F05D 2220/3216* (2013.01); *F05D 2240/12* (2013.01); *F05D 2260/85* (2013.01); *F05D 2270/092* (2013.01); *F05D 2270/30* (2013.01); *F05D 2270/304* (2013.01)

(56) References Cited

U.S. PATENT DOCUMENTS

2014/0000272 A1* 1/2014 Fichtner .................... F02C 9/20
                                                      60/773
2014/0130513 A1* 5/2014 Chiu ................... F04D 27/0246
                                                      60/805

OTHER PUBLICATIONS

Sep. 9, 2015 Search Report issued in British Patent Application No. 1505113.9.

\* cited by examiner

VARIABLE INLET GUIDE VANE SCHEDULING

The present disclosure concerns aero gas turbine engines. More specifically the disclosure concerns aero gas turbine engines with particular variable inlet guide vane scheduling, the schedules themselves and methods of conducting an in-flight start procedure for a windmilling aero gas turbine engine.

If it is desired to start an aero gas turbine engine in flight, e.g. following a flameout, a windmill restart is typically attempted. This uses on-rushing air through which the aircraft is passing to windmill the compressors and deliver air to the combustor. A sufficient quantity of fuel must also be delivered to the combustor in order for successful ignition. Fuel is typically pumped to the combustors by a fuel pump driven by a spool powered ancillary gearbox. Under certain flight conditions the windmilling effect of the on-rushing air may turn the relevant spool at a sufficient rate in order to pump sufficient fuel to the combustor for successful start. Where however the flight conditions tend towards a lower airspeed and/or lower altitude (denser air) the rotation rate of the relevant spool as a consequence of windmilling will be lower, and may therefore be insufficient for the delivery of the required quantity of fuel. As will be appreciated this may undesirably mean that as an aircraft descends a pilot is chasing an ever higher airspeed (requiring an ever increasing rate of descent) in order to achieve engine start.

The problem may be made worse where fuel is used as a process fluid in other systems, e.g. turbine case cooling, as this may increase the quantity of fuel 'leaked' to other systems (rather than to the combustor) and reduce spare capacity of the fuel pump. Solutions such as increasing pump capacity and/or other structural changes such as valves for selective isolation of systems using the fuel as a process fluid may be costly and add complexity.

According to a first aspect of the invention there is provided an aero gas turbine engine comprising optionally a compressor and optionally an array of variable inlet guide vanes optionally for the compressor, the angle of the variable inlet guide vanes optionally being controlled by scheduling, the scheduling comprising optionally a first component invoked for engine ground start and optionally a second component invoked for engine in-flight windmill start optionally at least under particular flight conditions and where the angle of the variable inlet guide vanes required by at least a portion of the second component is optionally greater than the angle of the variable inlet guide vanes required by at least a portion of the first component.

By increasing the angle of the inlet guide vanes, i.e. closing them somewhat (or indeed fully closing them to the limit of their travel) during engine in-flight windmill start by comparison with their positions when a 'normal' engine ground start is undertaken, the rate of rotation of the compressor may be increased. Where a spool of the compressor with increased rate of rotation drives a fuel pump (e.g. via an ancillary gearbox), the fuel pump may pump more fuel, potentially increasing the size of an in-flight windmill start envelope. Conversely the disclosure may permit a similarly sized in-flight start envelope with use of a smaller capacity fuel pump. Because the disclosure concerns an alteration to the scheduling of the variable inlet guide vanes, it may not require structural alterations and may be implementable solely with an alteration in computer programming. Such an implementation may simplify retrofitting of the system and may mean that additional mechanical complexity and weight is not required.

As will be appreciated, where engine start is referred to, this should be interpreted to include activities leading up to ignition, ignition itself and initial spool-up of the engine thereafter rather than just the instant of ignition. Furthermore the scheduling components may take any suitable form, e.g. each could be schedules in their own right, or they could be biases selectively applicable to another schedule such as a nominal schedule.

Control in accordance with the scheduling may be performed by a controller. The controller may comprise at least one processor and at least one memory. The memory stores a computer program comprising computer readable instructions that, when read by the processor, cause the control described. These computer readable instructions may be, or may include the or each schedule component and/or schedule. The processor may be located on the gas turbine engine, or may be located remote from the gas turbine engine, or may be distributed between the gas turbine engine and a location remote from the gas turbine engine. Similarly the memory may be located on the gas turbine engine, or may be located remote from the gas turbine engine, or may be distributed between the gas turbine engine and a location remote from the gas turbine engine.

In some embodiments the compressor is provided on a spool and each of the first and second components are invoked over a range of spool speeds for the spool encompassing ignition and initial acceleration of the engine. As will be appreciated an engine start and acceleration procedure (whether on the ground or in-flight) may benefit from alternative variable inlet guide vane scheduling to scheduling used in normal 'steady-state' operation of the engine, even at similarly low spool speeds.

Each schedule component may demand a particular variable inlet guide vane angle for a particular spool speed. Thus a portion of a schedule component may correspond to a particular range of spool speeds within a broader range of spool speeds addressed by the schedule component. Similarly a part of a start procedure may be considered to correspond to a particular range of spool speeds.

In some embodiments the first and second components are invoked over a range of common spool speeds. Indeed it may be that each of the first and second components are invoked over the same range of spool speeds. Thus the increase in variable inlet guide vane angle demanded by the second component by comparison with the first component may occur over a corresponding range of spool speeds. Despite the similar spool speeds the second component may therefore be used to differentiate for the specific circumstances of an in-flight windmill start.

In some embodiments the variable inlet guide vane angle required by the second component is consistently at least as high as the angle required by the first component over corresponding spool speeds.

In some embodiments the second component requires an increased variable inlet guide vane angle by comparison with the first component at spool speeds below a particular spool speed. Additionally or alternatively the second component requires an increased variable inlet guide vane angle by comparison with the first component at spool speeds below between 10% and 20% of maximum rated spool speed and preferably at substantially 15% of maximum rated spool speed. Additionally or alternatively the second component requires an increased variable inlet guide vane angle by comparison with the first component at spool speeds below ignition.

In some embodiments the maximum variable inlet guide vane angle difference required by the first component by comparison with the second component at corresponding spool speeds is between 5° and 20° and preferably between 10° and 15°.

In some embodiments the first and second components require the same variable inlet guide vane angle at spool speeds above a particular spool speed. Additionally or alternatively the first and second components require the same variable inlet guide vane angle at spool speeds above between 10% and 20% of maximum rated spool speed and preferably at substantially 15% of maximum rated spool speed. Additionally or alternatively the first and second components require the same variable inlet guide vane angle at spool speeds above ignition.

As will be appreciated where the first and second components require the same variable inlet guide vane angle they may be combined into a single start component of the scheduling e.g. a single start component comprises the relevant portions of the first and second components.

In some embodiments the scheduling further comprises a nominal component invoked after whichever of the first and second components is invoked for engine start. The nominal component may be optimized for post start operation of the variable inlet guide vanes. Specifically the nominal component may address compressor stability, particularly at engine low power settings and during transient operation. Further the nominal component may enhance steady state efficiency e.g. at cruise.

As will be appreciated, when invoked, the first and/or second components may be manifested as a variable inlet guide vane angle bias applied to the nominal component.

In some embodiments the nominal component requires a decreased variable inlet guide vane angle at spool speeds above a particular spool speed.

In some embodiments the nominal component comprises variable inlet guide vane scheduling for spool speeds corresponding to spool speeds over which the first and/or second components are operational when invoked. Thus for instance the nominal component may determine variable inlet guide vane scheduling at relatively low spool speeds not associated with engine start including initial acceleration.

In some embodiments the first component requires a lower variable inlet guide vane angle than the nominal component over corresponding spool speeds. The decrease in angle demanded by the first component when invoked may be beneficial in preventing rotating stall drop-out pre-fuel on conditions and/or improving stall margin for engine ignition and initial acceleration.

In some embodiments the variable inlet guide vane angle required by the second component is the same as the angle required by the nominal component over part of the portion of the second component that requires a greater angle than the first component. The second component might therefore be considered to override the first component in the event of at least some in-flight windmill engine starts, prioritizing spool speed and coincidentally following the nominal component over a relevant range of spool speeds.

In some embodiments the spool of the compressor drives a fuel pump of the engine. Further the drive provided by the relevant spool may be provided indirectly e.g. via an ancillary gearbox.

In some embodiments the compressor is an intermediate pressure compressor. Nonetheless in other embodiments the compressor may be a high pressure compressor.

According to a second aspect there is provided scheduling in accordance with the first aspect.

According to a third aspect of the invention there is provided a method of conducting an in-flight start procedure for a windmilling aero gas turbine engine comprising scheduling variable inlet guide vanes over at least part of the start procedure for a compressor of the engine such that the angle of the variable inlet guide vanes is greater than scheduled over at least part of an engine ground start procedure.

As will be appreciated the method may be invoked only in accordance with particular conditions having been met. It may be for example that the method is invoked where the altitude of an aircraft powered by the engine is below a pre-determined level. Additionally or alternatively the method is invoked when the airspeed of the aircraft is below a predetermined level. Additionally or alternatively it may be that the method is invoked where the engine is outside of an operational envelope for start using a scheduling component suitable for engine ground start. Additionally or alternatively the method may be invoked only after a predetermined number of failed engine in-flight windmill start attempts. As will be appreciated, where the method is not invoked, but engine in-flight windmill start is desired, the scheduling component suitable for engine ground start may be invoked.

The skilled person will appreciate that except where mutually exclusive, a feature described in relation to any one of the above aspects of the invention may be applied mutatis mutandis to any other aspect of the invention.

Embodiments of the invention will now be described by way of example only, with reference to the Figures, in which.

Figure 1:
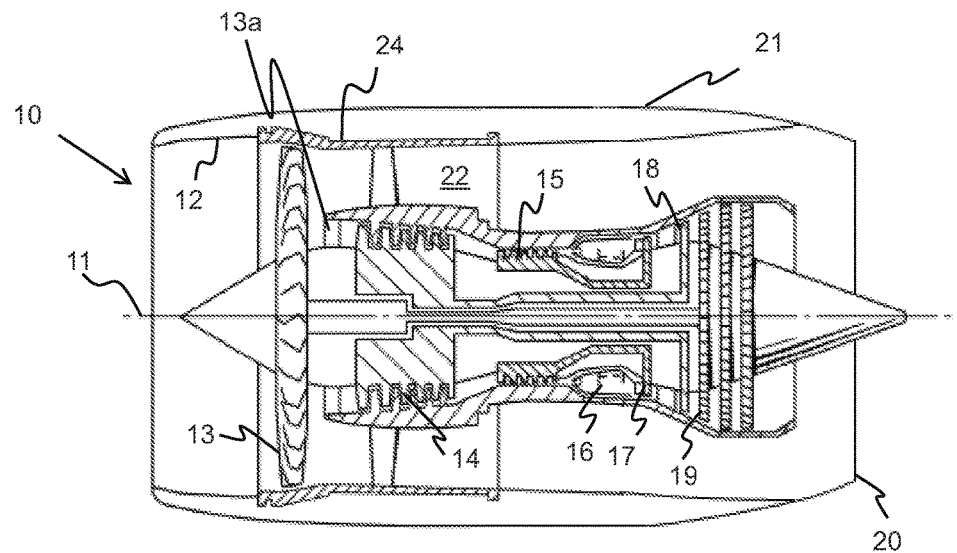
FIG. 1 is a sectional side view of a gas turbine engine.

With reference to FIG. 1, an aero gas turbine engine is generally indicated at 10, having a principal and rotational axis 11. The engine 10 comprises, in axial flow series, an air intake 12, a propulsive fan 13, an array of variable inlet guide vanes 13a, an intermediate pressure compressor 14, a high-pressure compressor 15, combustion equipment 16, a high-pressure turbine 17, and intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft. The intermediate pressure compressor 14 intermediate pressure turbine 18 and intermediate interconnecting shaft form an intermediate pressure spool. In use the intermediate pressure spool drives a fuel pump (not shown) via an ancillary gearbox (not shown) for delivering fuel to the combustion equipment 16.

Figure 2:
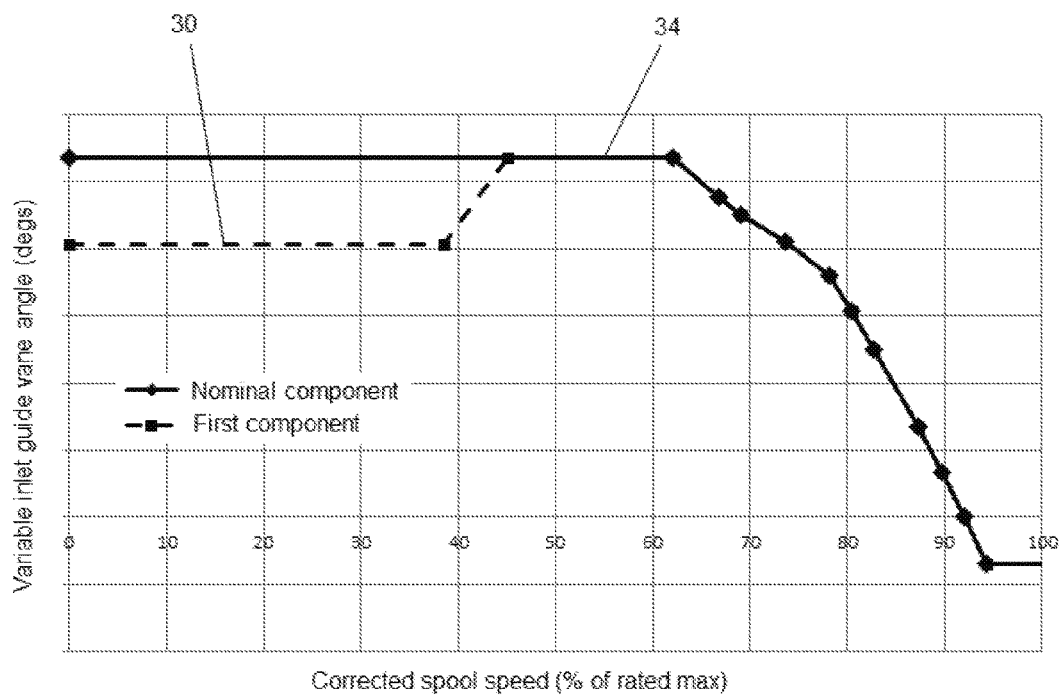
FIG. 2 is a graph showing nominal and first components of scheduling according to an embodiment of the invention.
Figure 3:
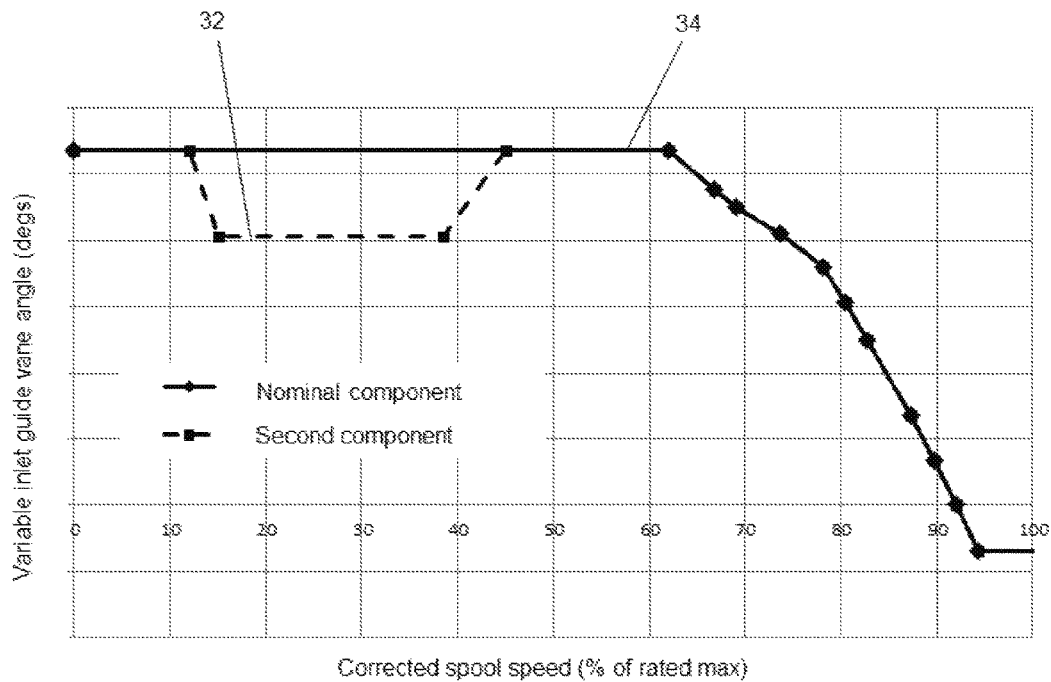
FIG. 3 is a graph showing nominal and second components of scheduling according to an embodiment of the invention.

Referring now to FIGS. 2 and 3, components of scheduling for determining the angle of the array of variable inlet guide vanes 13a are shown.

The scheduling has a first component 30 invoked for engine ground start, a second component 32 invokable for engine in-flight windmill start and a nominal component 34 invoked after whichever of the first 30 and second 32 components is used for start of the engine. With respect to each component 30, 32 and 34 the angle of the vanes demanded varies with the speed of the intermediate pressure spool. As the angle increases so the vanes close, providing a decreased flow area for air travelling towards the intermediate pressure compressor.

As shown in both FIG. 2 and FIG. 3, the nominal component 34 of the scheduling requires a high (maximum possible) variable inlet guide vane angle from an intermediate pressure spool speed of 0% rated maximum through approximately 60% rated maximum. As intermediate pressure spool speed increases beyond this the nominal component 34 demands a substantially steady decrease in variable inlet guide vane angle up to approximately 95% rated maximum. From approximately 95% rated maximum to 100% rated maximum the variable inlet guide vane angle required is a consistent small angle (minimum possible).

Referring now to FIG. 2 alone, the first component 30 of the scheduling is invokable only for intermediate pressure spool speeds between 0% and approximately 45% of rated maximum. Between 0% and substantially 40% it requires a consistent variable inlet guide vane angle smaller than the requirement of the nominal component 34 at corresponding intermediate pressure spool speeds, though nonetheless at a relatively high angle (approximately three quarters of maximum closed position). At intermediate pressure spool speeds increasing from substantially 40% to substantially 45% of the rated maximum, the first component 30 requires a consistently increasing variable inlet guide vane angle rising to the same angle requirement as the nominal component 34 at substantially 45%.

Referring now to FIG. 3 alone, the second component 32 of the scheduling is invokable only for intermediate pressure spool speeds between 0% and approximately 45% of rated maximum. Between 0% and substantially 10% it requires a consistent variable inlet guide vane angle consistent with the requirement of the nominal component 34 at corresponding intermediate pressure spool speeds (maximum possible). At intermediate pressure spool speeds increasing from substantially 10% to substantially 15% of the rated maximum, the second component 32 requires a consistently decreasing variable inlet guide vane angle, falling to a consistently required angle (approximately three quarters of maximum closed position) between approximately 15% and 40%. At intermediate pressure spool speeds increasing from substantially 40% to substantially 45% of the rated maximum, the second component 32 requires a consistently increasing variable inlet guide vane angle rising to the same angle requirement as the nominal component 34 at substantially 45%.

As will be appreciated in view of the above, when invoked, both the first 30 and second 32 components require a bias to the nominal component 34, to thereby reduce the angle of the variable inlet guide vanes at particular intermediate pressure spool speeds.

It is noteworthy that the first 30 and second 32 components are invoked over a range of common intermediate pressure spool speeds and indeed the same range of intermediate pressure spool speeds (in this case 0% to substantially 45% of maximum rated intermediate pressure spool speed). The variable inlet guide vane angle required by the second component 32 is consistently at least as high as the angle required by the first component 30 over corresponding intermediate pressure spool speeds. More specifically the angle of the variable inlet guide vanes required over a portion (0% to substantially 15% of maximum rated intermediate pressure spool speed) of the second component 32 is greater than the angle required by the first component 30 over corresponding intermediate pressure spool speeds. Further from substantially 15% to 45% of maximum rated intermediate pressure spool speed the first 30 and second 32 components require the same angle.

In comparing the first component 30 with the nominal component 34, the first component 30 requires a lower variable inlet guide vane angle than the nominal component 34 over corresponding intermediate pressure spool speeds (0% to substantially 45% of maximum rated intermediate pressure spool speed).

In comparing the second component 32 with the nominal component 34, the second component 32 requires a variable inlet guide vane angle that is the same as the requirement of the nominal component 34 over part (0% to approximately 10% of intermediate pressure spool maximum rated speed) of the portion of the second component 32 that requires a greater angle than the first component 30.

In use the scheduling is used to control the angle of the array of variable inlet guide vanes throughout the operational envelope of the aero gas turbine engine.

When the aero gas turbine engine is started on the ground, the initial stages comprise turning the engine using a start system (e.g. an air starter pumping air used to turn the intermediate pressure turbine 18, or turning the intermediate pressure spool using a motor supplying drive through the auxiliary gearbox). Rotation of the intermediate pressure spool turns the fuel pump, pumping fuel to the combustion equipment 16. With sufficient airflow and fuel reaching the combustion equipment 16, fuel on and ignition is instigated and the engine can be accelerated under its own power. During such a start the first component 30 is invoked for control of the variable inlet guide vane angle. The reduced angle (more open) required by the first component 30 by comparison with the nominal component 34 reduces the likelihood of rotating stall of the intermediate pressure compressor prior to fuel on and increases the stall margin of the high pressure compressor 15 at ignition and initial acceleration.

Once the engine has started (including an initial acceleration to an intermediate pressure spool speed of approximately 45% of rated maximum), the nominal component 34 is invoked (at the expense of the first component 30) for continued control over the angle of the variable inlet guide vanes. The nominal component 34 is invoked throughout the remainder of the engine run, even when the engine is operated in a regime where the intermediate pressure spool speed is within the range in which the first component 30 is invokable. The scheduling required by the nominal component 34 increases stability and stall margin of the intermediate pressure compressor 14 throughout its operating regime.

On occasion it may be desirable to start the engine 10 in-flight, for instance during testing and/or in the event of a flameout. In such cases, as with a ground start, it is necessary that sufficient air and fuel reach the combustion equipment 16 for ignition to be successful. In some flight envelopes, especially where an aircraft powered by the engine is at relatively low altitude or has a relatively low airspeed, the windmill effect on the intermediate pressure spool of onrushing air may be insufficient to drive the fuel pump at the required rate for ignition. Specifically at lower altitude the denser air will mean that spools of the engine will windmill at a slower rate for a given airspeed. Further, especially where the aircraft is already at lower altitude, it may be undesirable or inadvisable for a pilot to seek an increase in airspeed via increasing the descent rate of the aircraft.

Figure 4:
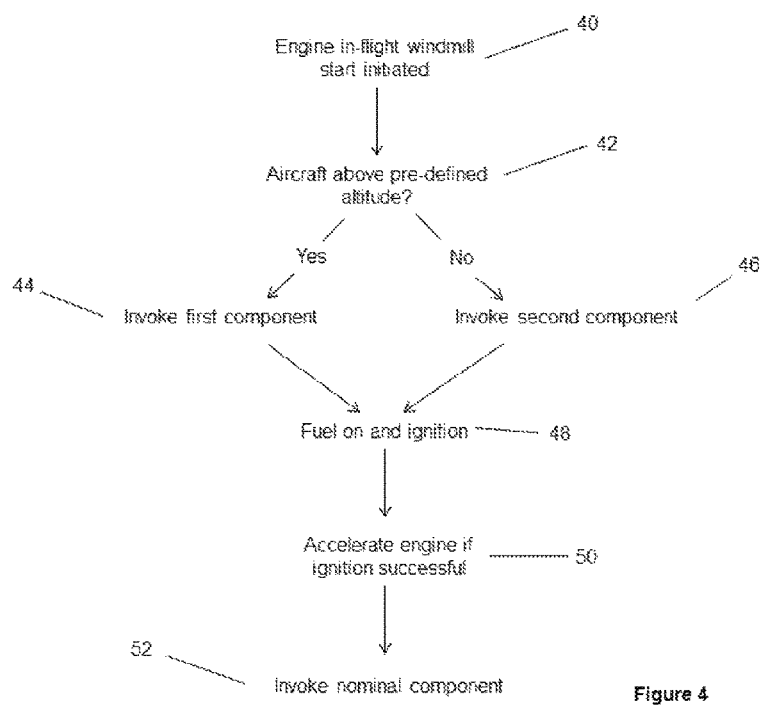
FIG. 4 is a flow diagram showing an engine start procedure in accordance with an embodiment of the present invention.

Referring now to FIG. 4, where an engine in-flight windmill start is initiated 40 for the engine 10 of the present embodiment, a check 42 is performed to determine whether the aircraft is above a pre-determined altitude. If the aircraft is above the predetermined altitude the first component 30 is invoked 44. Where however the aircraft is not above the predetermined altitude the second component 32 is invoked 46 in preference to the first component 30. It has been found that increasing the angle of the variable inlet guide vanes somewhat counterintuitively increases the windmill rotation rate of the intermediate pressure spool. Consequently use of the second component 32 (which requires a larger variable inlet guide vane angle than the first component 30 over an initial range of intermediate pressure spool speeds) may cause additional fuel to be pumped to the combustion equipment 16 than would otherwise be the case. This in turn may allow for successful ignition 48 even at lower aircraft altitudes. Following ignition the decrease in variable inlet guide vane angle required by the second component 32 may increase the stall margin of the high pressure compressor 15 during initial acceleration 50.

Once the engine has started (including the initial acceleration 50 to an intermediate pressure spool speed of approximately 45% of rated maximum), the nominal component 34 is invoked 52 (at the expense of the second component 32) for continued control over the angle of the variable inlet guide vanes. The nominal component 34 is invoked throughout the remainder of the engine run, even when the engine is operated in a regime where the intermediate pressure spool speed is within the range in which the second component 32 is invokable. The scheduling required by the nominal component 34 increases stability and stall margin of the intermediate pressure compressor 14 throughout its operating regime.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. An aero gas turbine engine comprising a compressor and an array of variable inlet guide vanes upstream of the compressor,
a controller configured to control an angle of the variable inlet guide vanes in accordance with a scheduling,
the scheduling comprising a first component invoked for engine ground start, and
a second component invoked for engine in-flight windmill start, and where the angle of the variable inlet guide vanes required by at least a portion of the second component is greater than the angle of the variable inlet guide vanes required by at least a portion of the first component.

2. An aero gas turbine engine according to claim 1 where the compressor is provided on a spool and each of the first and second components are invoked over a range of spool speeds for the spool encompassing ignition and initial acceleration of the engine.

3. An aero gas turbine engine according to claim 2 where the first and second components are invoked over a range of common spool speeds.

4. An aero gas turbine engine according to claim 3 where the variable inlet guide vane angle required by the second component is consistently at least as high as the angle required by the first component over corresponding spool speeds.

5. An aero gas turbine engine according to claim 3 where the second component requires an increased variable inlet guide vane angle by comparison with the first component at spool speeds below a particular spool speed.

6. An aero gas turbine engine according to claim 3 where the first and second components require the same variable inlet guide vane angle at spool speeds above a particular spool speed.

7. An aero gas turbine engine according to claim 2 where the scheduling further comprises a nominal component invoked after whichever of the first and second components is invoked for engine start.

8. An aero gas turbine engine according to claim 7 where the nominal component comprises variable inlet guide vane scheduling for spool speeds corresponding to spool speeds over which the first and/or second components are operational when invoked.

9. An aero gas turbine engine according to claim 7 where the first component requires a lower variable inlet guide vane angle than the nominal component over corresponding spool speeds.

10. An aero gas turbine engine according to claim 7 where the variable inlet guide vane angle required by the second component is the same as the angle required by the nominal component over part of the portion of the second component that requires a greater angle than the first component.

11. An aero gas turbine engine according to claim 1 where the spool of the compressor drives a fuel pump of the engine.

12. An aero gas turbine engine according to claim 1 where the compressor is an intermediate pressure compressor.

13. A method of scheduling control of an angle of an array of variable inlet guide vanes upstream of a compressor of an aero gas turbine engine, the method comprising:
providing a first component invoked for engine ground start; and
providing a second component invoked for engine in-flight windmill start, wherein the angle of the plurality of variable inlet guide vanes required by at least a portion of the second component is greater than the angle of the plurality of variable inlet guide vanes required by at least a portion of the first component.

14. A method of conducting an in-flight start procedure for a windmilling aero gas turbine engine comprising scheduling variable inlet guide vanes upstream of a compressor over at least part of the start procedure for the compressor of the engine such that the angle of the variable inlet guide vanes is greater than an angle of the variable inlet guide vanes scheduled over at least part of an engine ground start procedure.

15. A method according to claim 14 invoked only when the altitude of an aircraft powered by the engine is below a pre-determined level.

\* \* \* \* \*